Oct. 14, 1958        R. P. HAVILAND        2,856,142
ORIENTATION CONTROL FOR A SPACE VEHICLE
Filed July 18, 1956
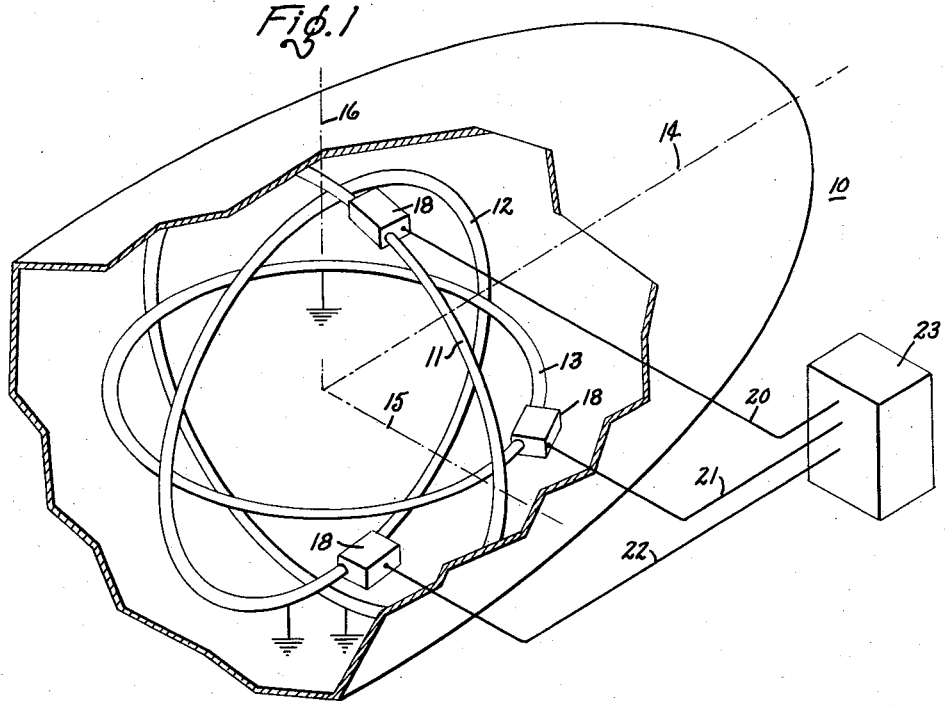
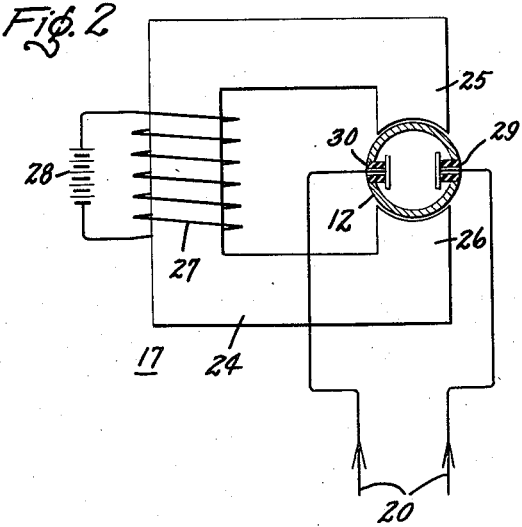
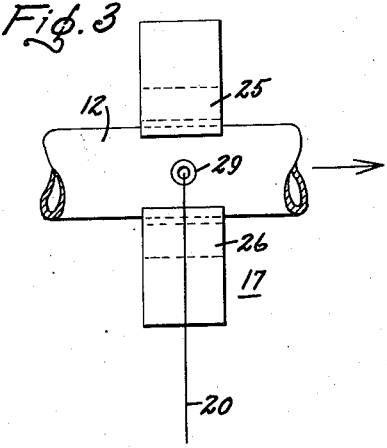
INVENTOR.
Robert P. Haviland
BY Alfred B. Levine
His Attorney

United States Patent Office 2,856,142
Patented Oct. 14, 1958

2,856,142

ORIENTATION CONTROL FOR A SPACE VEHICLE

Robert P. Haviland, Schenectady, N. Y., assignor to General Electric Company, a corporation of New York Application July 18, 1956, Serial No. 598,618

6 Claims. (Cl. 244—93)

This invention generally relates to the attitude control of navigable bodies passing through a fluid or non-fluid medium, and more particularly to the attitude control of such bodies by internal means.

Conventional techniques for controlling the attitude of bodies such as aircraft, ships, submarines, and the like passing through fluid mediums depend upon the torque reaction of the fluid medium with the rudder, elevator, aileron, or other craft appendage. However, in the event that the craft is moving through a substantial vacuum, such as beyond the atmosphere of the earth, the craft cannot be controlled by such forces because of the substantial absence of any fluid.

In accordance with the present invention, there is provided a means for displacing weighted materials at a controllable rate and in a desired direction or directions within the craft in such a manner as to produce variable torques to control the attitude of the craft independently of the absence or presence of a fluid medium outside of the craft. Specifically, there is provided at least one endless conduit within the craft through which can be circulated at variable speeds a relatively heavy fluid. Movement of the fluid through the conduit produces a torque reacting against the craft to turn the craft. By suitably orienting the conduit within the craft, the torque is produced about a desired craft axis, and by variably controlling the rate and direction of circulating the fluid, the magnitude of this torque may be varied as desired.

It is accordingly one object of the present invention to provide a relatively lightweight and dependable system, occupying a minimum volume, for controlling the attitude of a craft moving through a fluid or non-fluid medium.

A further object of the present invention is to provide such a system operating entirely inside of the craft.

A still further object of the present invention is to provide such a system employing no moving solid parts.

Other objects and many attendant advantages will be more readily comprehended to those skilled in the art upon a detailed consideration of the following specification taken with the accompanying drawings wherein:

Fig. 1 is a perspective view, partially cut away, depicting one preferred embodiment of the invention, and;

Figs. 2 and 3 are schematic illustrations, in side elevation and end view, respectively, depicting details of a fluid pump employed in Fig. 1.

Referring now to Fig. 1 for a detailed consideration of one preferred embodiment of the invention, there is generaly shown an aircraft or watercraft body structure 10 within which is fixedly positioned three orthogonally arranged endless fluid carrying conduits 11, 12 and 13, each of which may be in circular form as shown. Conduit 11 is preferably positioned within the craft in a geometrical plane perpendicular to the roll axis 14, conduit 12 is preferably positioned in a geometrical plane perpendicular to the pitch axis 15, and conduit 13 is preferably positioned in a geometrical plane perpendicular to the yaw axis 16.

Within each of these conduits is preferably contained a dense conducting fluid, such as mercury or a low melting point metal or the like, which is adapted to be reversedly pumped through the conduit at a variable or constant speed or maintained in a stagnant condition by a suitable electromagnetic or other pumping means 18. Each of these pumps, in turn, is adapted to be individually electrically energized over lines 20, 21 and 22, by signals from suitable sensing devices mounted within the craft, such as gyroscopes, accelerometers, or the like (not shown) that for purposes of illustration are depicted as being housed in a box 23.

In operation, the accelerometer or other sending device (not shown) within box 23 detects attitude deviation, acceleration, or other disturbance of the craft about its roll axis 14, for example, and after suitable amplification generates an electrical signal over line 20 proportional thereto in polarity and amplitude. This signal energizes pump 18 associated with conduit 11 to accelerate the dense liquid within conduit 11 in such a manner as to develop a reaction or torque within the craft sufficient to counteract the original disturbance and return the craft to its desired attitude position, velocity, or acceleration about this roll axis. In a similar manner, other appropriate sensing devices within box 23 detect disturbances about one or more of the other craft stability axes and control the direction, speed, and acceleration of fluids within the conduits 12 and 13 to suitably stabilize or control the craft about these other axes, as desired.

Although three such conduits are shown and described, it is believed evident that the number and placement of such devices are dependent upon the stability or control needed for a particular craft and either a greater or lesser number of such conduits, arranged as desired, may be employed. It is further believed evident that although the conduits are illustrated as being in circular form, they may be configured in any desired endless form to conform with the inner or outer surface of the craft or structure, thereby to minimize wasted space within the craft by occupying otherwise unusable space. The sole limitation upon the shape and placement of such conduits being, of course, that the axis of gyration of the circulating liquid is about a desired control axis.

As shown by Figs. 2 and 3, a preferred electrical pumping means 18 for controlling the fluid flow speed and direction through the conduit comprises an armature 24 having at least one pair of poles 25 and 26 oriented transverse to conduit 12, thereby to transmit a flux therethrough in the transverse direction when energized by the magnetic field generated by winding 27 upon the application of a suitable voltage source 28. Within the air gap between poles 25 and 26, and on opposite sides of the conduit and immersed in the conducting fluid are fastened at least two electrodes 29 and 30, suitably electrically insulated from the conduit wall, as shown. These electrodes are arranged, with reference to the armature poles 25 and 26, that upon the application of a voltage potential across conductors 20 a current flows through the dense conducting fluid in a directon perpendicular to the armature flux. This transverse current produces a motor effect in reacting with the armature flux, thereby providing a reversible electromagnetic fluid pump varying in intensity and direction with the amplitude and phase of the voltage energizing electrodes 29 and 30.

Although but one preferred embodiment of the present invention has been illustrated and described, it is believed evident that many changes may be made by those skilled in the art without departing from the spirit and scope of this invention. Accordingly, this invention is to be considered as being limited only in accordance with the following claims appended hereto.

What is claimed is:

1. In a device for stabilizing the attitude of a craft, movable through a fluid or substantial vacuum, about a given fixed control axis of the craft, an endless conduit containing a dense liquid, reversible pumping means energizable by a signal proportional to a disturbance of said craft about said axis for propelling said fluid through the conduit at a speed and direction proportional to said signal, said conduit being positioned within said craft such that the effective radius of gyration of said fluid through the conduit is about said fixed axis.

2. In the device of claim 1, a plurality of said conduits, each being positioned within said craft to provide a radius of gyration of the fluid passing therethrough about a different control axis of said craft.

3. In a device for controlling a craft through a fluid and non-fluid medium about a given axis, means responsive to a disturbance of the craft about said axis for generating a signal proportional thereto, an endless conduit containing a dense liquid, said conduit being positioned in said craft such that the effective radius of gyration of said fluid movable therethrough is about said given axis, and pumping means responsive to said signal for propelling said fluid at a variable speed and reversibly in a direction to counteract said disturbance.

4. In the device of claim 3, a plurality of said conduits, each being positioned within said craft to provide a radius of gyration of the fluid passing therethrough about a different control axis of said craft.

5. In a device for controlling a craft through a fluid and non-fluid medium about a given axis, means responsive to a disturbance of the craft about said axis for generating a signal proportional thereto, an endless conduit containing a dense conducting liquid, said conduit being positioned in said craft to enable the effective radius of gyration of said fluid movable through the conduit to be about said given axis, and means responsive to said signal for propelling said fluid through said conduit in a direction and at a speed and acceleration to generate a torque counteracting said disturbance.

6. In the apparatus of claim 5, a plurality of said conduits and each being fixedly positioned on said craft to provide a radius of gyration of the circulating fluid therethrough about a different craft control axis.

References Cited in the file of this patent

UNITED STATES PATENTS

| | | |
|---|---|---|
| 1,841,606 | Kollsman | Jan. 19, 1932 |
| 2,158,180 | Goddard | May 16, 1939 |
| 2,734,383 | Paine | Feb. 14, 1956 |